United States Patent Office 2,734,528
Patented Feb. 14, 1956

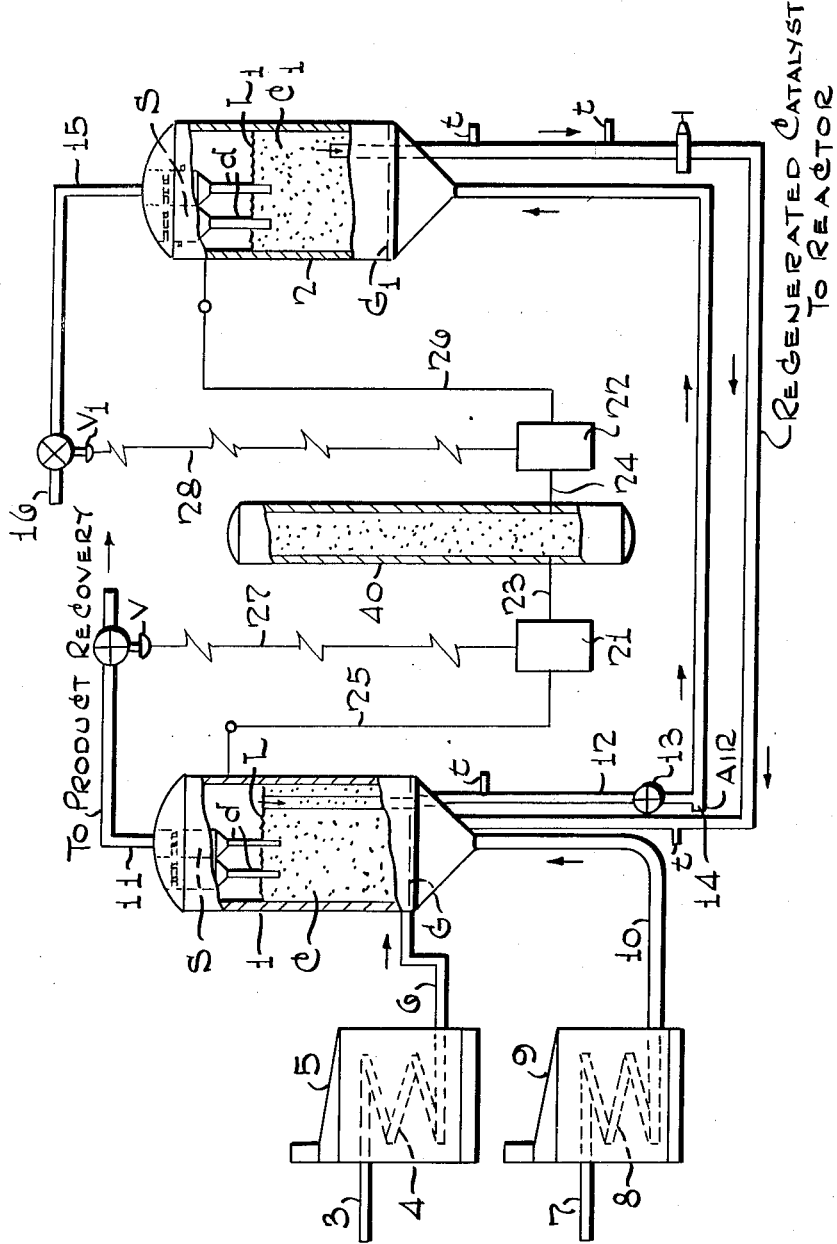

2,734,528

PRESSURE CONTROL IN FLUID SOLIDS SYSTEM

John F. Moser, Jr., Baton Rouge, La., assignor to Esso Research and Engineering Company, a corporation of Delaware Application July 23, 1952, Serial No. 300,399

9 Claims. (Cl. 137—571)

The present invention relates to the improvements in the pressure control of multi-vessel systems containing solids in the form of dense fluidized beds. More particularly, the present invention relates to improvements in controlling the pressure differential between two or more vessels containing fluidized beds of solids, which vessels operate at superatmospheric pressure and are in communication with each other.

In hydroforming naphthas in the presence of a fluidized bed of powdered hydroforming catalysts, it is necessary and desirable to operate under superatmospheric pressure which may amount to pressures as high as 400 p. s. i. Since the catalyst acquires carbonaceous and other deposits during the hydroforming process, it is necessary to withdraw the catalyst from the hydroforming zone and conduct it to a second zone where it is treated with an oxygen-containing gas to remove the said deposits. Both zones operate under substantially the same pressure. It will be readily understood that an upset or disturbance in these vessels with respect to pressure could interfere with the flow of catalyst in the desired direction from one vessel to the other. Thus, it may happen that if the pressure in, let us say the regeneration zone, exceeds by a substantial amount the pressure existing in the reaction vessel, then catalyst proceeding through transfer lines from the reactor to the regenerator may be caused to reverse its flow and thus upset the operation of the system.

The present invention will be described in terms of its application to the hydroforming process with the understanding that the present invention is applicable to any system in which fluidized solids pass from one vessel to another and in which the vessels are operated under superatmospheric pressure.

Hydroforming may be defined as a process in which virgin naphthenic naphthas are contacted at elevated temperatures and pressures in the presence of added hydrogen with a solid catalytic material. The main reaction involved is the dehydrogenation of naphthenes to form the corresponding aromatic as where, for example, methylcyclohexane is dehydrogenated to form toluene. In addition, some isomerization of paraffins and some cracking of paraffins also occur.

The main object of the present invention is to provide an improved fluidized solids system in which the solids circulate between two or more vessels in communication with each other, and which vessels are operated under superatmospheric pressure in such a manner as to maintain the system in pressure balance.

Another object of the present invention is to provide means for insuring the smooth operation of a hydroforming process in which the catalyst is in the form of dense fluidized beds in both a reaction zone and a regeneration zone.

Other and further objects of the invention will appear from the following more detailed description and claims.

In the accompanying drawing, the essential apparatus of a hydroforming system, including the improved pressure control means, are depicted. In the drawing similar reference characters refer to similar parts.

Referring in detail to the drawing, 1 represents a hydroforming reaction zone and 2 represents a catalyst regeneration zone. Each zone contains a bed of powdered catalyst C in the form of dense fluidized beds. The oil to be treated enters the present system through line 3, is forced through fired coil 4 disposed in a suitable furnace 5 where it is heated to a temperature within the range of from about 950° to 1000° F. The oil is withdrawn from coil 4 through line 6 and charged to reactor 1. Simultaneously, hydrogen is withdrawn from line 7, forced through coil 8 in a furnace 9 where it is heated to a temperature of around 1200° F., then is withdrawn from coil 8 through line 10 and passed into the bottom of vessel 1. The hydrogen passes upwardly in reactor 1 through a gas distributing means such as grid G into the fluidized bed of catalyst C where it mixes with the oil in contact with the catalyst, and under conditions of temperature, pressure, and contact time which are known to the art, the desired conversion occurs, whereupon the product passes from the dense phase through a disperse phase, disposed in the reactor from an upper dense space level L to the top of the reactor. This latter space constitutes a catalyst disengaging space wherein the main bulk of the catalyst is separated from the gasiform material, the catalyst descending toward the dense bed. The gasiform product material is forced through one or more cyclone separators S deposited in the top of the reactor for the purpose of separating catalyst still entrained in said vapors, the separated catalyst being returned to the dense phase through one or more dip pipes $d$. The product vapors substantially free of entrained catalyst pass from the reactor via line 11 and are delivered to a product recovery system, wherein the desired product is recovered in conventional equipment (not shown). Hydrogen is recovered from this system and returned to line 7 for reuse in the process.

As previously indicated, in a hydroforming process of the type herein described, the catalyst becomes deactivated by the accumulation of carbonaceous deposits during the reaction in vessel 1. It, therefore, becomes necessary to regenerate the catalyst. Toward this end, catalyst is withdrawn from the reactor through a standpipe 12 carrying taps $t$. Steam is injected through the taps $t$ for the purpose of stripping therefrom volatile hydrocarbons. The steam and volatilized hydrocarbons pass from the upper end of the standpipe at a point near the level L and co-mingle with the product above this dense phase level. The flow of catalyst in standpipe 12 is controlled by a suitable valve 13. The standpipe discharges into an air stream 14 wherein the catalyst is formed into a suspension and carried into the bottom of regeneration vessel 2 wherein the said catalyst passes upward through gas distributing means G and forms with the catalyst a dense fluidized bed extending from G to L'. In regenerator 2, the catalyst is cleansed and regenerated by oxidation of the contaminants to form fumes which pass from the dense phase through a light phase extending from L' to the top of the generator, this space constituting a catalyst disengaging space in the same manner as in reactor 1. These regeneration fumes are forced through cyclone separators S to separate catalyst still entrained therein, which catalyst is returned to the dense phase through dip pipes $d$. The regeneration fumes emerge from the regenerator through line 15 and are eventually rejected from the system through line 16.

In the interest of simplicity and because they are well known, the operating conditions in vessel 1 and the conditions prevailing in regenerator 2 have not been described in detail except to say that both vessels operate under high pressure. Furthermore, detailed description of the method of purifying the product obtained from reactor 1 has been omitted because this also is well known. The engineer will also understand that in commercial operation use would be made of such accessory apparatus not shown in the drawing, such apparatus including heat exchangers, gas-liquid separators, distillation columns, flow meters, etc.

As previously indicated, the present invention goes to the matter of maintaining vessels 1 and 2 at substantially the same pressure. In any two vessel system in which fluidized solids circulate from one vessel to the other, as for example, in the hydroforming system described above, one of the major problems in common is that of controlling the pressures in the vessels in order to maintain the unit in pressure balance. This is particularly true where the vessels operate under high pressure since slight percentage changes in the total pressure of a vessel may exceed the slide valve total differential pressure and result in a flow reversal. For example, with reaction vessel 1 at 200 p. s. i. g., the available slide valve differential pressure would be of the order of 10 p. s. i. g. or only 5% of the total pressure.

The problem of pressure control in a two vessel system of this character is particularly complicated by the fact that pressure in each vessel is in part dependent on pressure in the other vessel. Because of this factor, attempts to control pressures in the two vessels by vessel to vessel differential pressure controllers result in unstable control characterized by upset of pressure conditions in both vessels initiated by minor fluctuations in the pressure of either vessel.

The present invention includes a relatively simple but an effective method of obtaining close pressure control in a system of the kind described herein. In this system, the vessel pressure is measured indirectly as a differential pressure between the reaction vessel and the fixed constant pressure exerted by a column of fluid of the proper height and density. This small pressure differential is maintained constant by means presently to be described. This control system is particularly characterized by the independent (rather than dependent) control of pressure in each vessel, while maintaining a desired differential pressure between the two vessels. Thereby small fluctuations in the pressure of one vessel do not upset the control of the other vessel.

The pressure control system of this invention utilizes a source of constant pressure, preferably providing substantially that pressure at which the two vessels are to be maintained. As will be seen, the constant pressure source could constitute a fluid charged vessel or bomb, a constant pressure pumping system, or the like. Preferably, however, the constant pressure source comprises a liquid column, having a height sufficient to provide the desired pressure at the foot of the column. A mercury column is particularly contemplated for use.

A pressure differential controller is connected to the constant pressure source and to one of the two vessels in which pressure is to be controlled. This controller will thus detect any change in the differential pressure between the constant pressure source and the vessel to which it is connected. A second pressure differential controller is similarly connected to the constant pressure source and the other of the two vessels in which pressure is to be controlled. Each of these pressure differential controllers are then used to actuate appropriate pressure control means in the two vessels, serving to maintain fixed pressure differentials between each vessel and the constant pressure source, and serving to maintain a fixed pressure differential between the two vessels.

An important feature of this pressure control system may be referred to as the "control amplification factor." If each of the vessels is to be maintained at a pressure of about 200 p. s. i., a 10 p. s. i. change in pressure amounts to only a 5% change in pressure which is sufficiently small to complicate close control by ordinary procedures. However, by referring the pressure of each vessel to a constant pressure source of about the same pressure, extremely large percentage changes in the differential pressure will be created. Thus, if the constant pressure source has a pressure within one or two p. s. i. of the pressure to be controlled, a 10 p. s. i. change in pressure will establish at least a 400% change in the differential pressure. This "control amplification factor" facilitates precise pressure control in this invention.

Referring again to Figure 1, there is provided as shown a vessel 20 holding a column of any suitable liquid such as mercury, the said column being of sufficient height to develop at its bottom a static pressure comparable to that existing in vessels 1 and 2. This pressure would be maintained substantially constant at a value, in the case of hydroforming, of about 195 p. s. i. where the pressure in vessels 1 and 2 would be about 200 p. s. i. As indicated in the drawing, the column of liquid 20 is in communication at its lower portion with two differential pressure metering devices 21 and 22 through pipes 23 and 24, respectively. These metering devices are standard equipment made, for example, by companies such as the Foxboro Instrument Company of Foxboro, Massachusetts. The meters are generally known as "differential pressure controllers" and ordinarily include provision to record the differential pressures determined by the meters. Such meters function to provide a hydraulic or electrical signal proportional to the differential pressure of two fluid lines connected to the meter. In the drawing meters 21 and 22 are connected to lines 23 and 24 respectively, as stated, and also to lines 25 and 26 with vessels 1 and 2, respectively. Thus, the pressure range of the controlling metering devices 21 and 22 are only about 5 p. s. i. g. despite the fact that the reaction system is at 200 p. s. i. g.

Thus, differential pressure meter 21 determines the differences in pressure between vessel 1 and mercury column 20, while meter 22 determines the difference in pressure between vessel 2 and mercury column 20. Assuming these meters are of the electrical control type, an electrical signal would be produced by each meter proportional to these differential pressures. These electrical signals could be used to regulate electrical control valves, for example, valves of the solenoid type. The meters particularly illustrated, however, are of the pneumatic type and provide a controlled air pressure proportional to differential pressures impressed across the meters. These controlled air pressures developed by the two meters are used to control pneumatic throttling valves associated with vessels 1 and 2. Thus, metering devices 21 and 22 are in communication by means of a gas through lines 27 and 28 with valves V and $V_1$, respectively. As shown in the drawing, valve V is in the exit line from the reactor while valve $V_1$ is in the exit line from the regenerator, and these valves control the pressure existing in the reactor and the regenerator, respectively.

If for any reason the pressure in reactor 1 increases, say, by 5% to 210 p. s. i. g., then immediately this increase produces through line 25 a very large increase of about 200% in the reading on control meter 21. Meter 21 thus acted upon serves to activate through line 27, which contains gas, valve V causing it to be turned in a more open position thus lowering the pressure in reactor 1. In like manner if the pressure in reactor 1 increases by only about 0.5% to, say, 201 p. s. i. g., nevertheless, a substantial increase of about 20% is effected on control meter 21 through line 25 so that the same correction action through valve V occurs.

In like manner, the pressure is controlled in regenerator 2 responsive to small percentage changes in the said regenerator to either cause valve $V_1$ in line 15 to be positioned in the more open or closed setting as the occasion requires.

The precise details of construction and the method of operating the meters 21 and 22 do not, as previously indicated, go to the present invention, nor do the activation of these meters through lines 25 and 26 go to the heart of the present invention. Furthermore, the activation of the valves through the gas in lines 27 and 28 responsive to the activation of meters 21 and 22 by pressure changes in vessels 1 and 2 per se do not form the present invention.

The present invention goes to the combination shown in the drawing and, in particular, to the use of the column of liquid of sufficient height and density to exert a pressure of the same order as that existing in the vessels. This column 20 may contain mercury but it may also contain various other suitable liquids and even may contain a column of heavy fluidized solids. It is to be noted that merely one column 20 of liquid or the like is necessary to obtain the objects of the present invention.

To recapitulate briefly, the present invention provides means for maintaining two or more vessels opearting under pressure at substantially the same pressures by correcting sudden surges or drops in pressure in either vessel by means which are immediately responsive even though the pressure surges or drops themselves are only a small fraction of the total pressure. Essentially, this correction is accomplished through the agency of an elongated column of a heavy fluid sufficiently high to develop a fixed static pressure of the same order of that existing in the vessels. Small changes in the pressure in either vessel immediately brings into operation the means disclosed herein for actuating a valve disposed in the gas or vapor outlet pipe of the vessel, to bring the said valve into a position which will increase or decrease the pressure as the case requires to correct the change in pressure, to the desired values.

Numerous modifications to the invention may be made by those who are familiar with the art without departing from the spirit thereof.

What is claimed is:

1. A pressure control arrangement for maintaining a fixed differential pressure in two vessels comprising in combination: conduit means providing open communication between said vessels, a source of constant pressure, a first and second differential pressure metering device adapted to provide a control signal proportional to differential pressures impressed on each metering device, fluid connections between one of said vessels and the said constant pressure source to the first differential pressure metering device, fluid connections between the other of said vessels and the said constant pressure source to the second differential pressure metering device, control valves associated with each of said vessels adapted to affect the pressure in the vessels, and means connecting each of said differential pressure metering devices to the respective control valves of each vessel whereby said control signals can actuate said valves.

2. The arrangement defined by claim 1 in which said constant pressure source constitutes a liquid column.

3. The arrangement defined by claim 1 in which said control signal is a pneumatic pressure.

4. The arrangement defined by claim 1 in which said control signal is an electrical voltage.

5. The arrangement defined by claim 1 in which the said control valve associated with each vessel is arranged to vent each vessel.

6. A pressure control arrangement for maintaining a fixed differential pressure between two vessels comprising in combination: conduit means providing open communication between said vessels, a source of constant fluid pressure, means to provide a pneumatic signal proportional to the differential pressure of one of said vessels and the said source, means to provide a second pneumatic signal proportional to the differential pressure of the other of said vessels and the said source, a pneumatic control valve associated with each of said vessels, and pneumatic connections between said means to provide a pneumatic signal and the said valves, whereby changes in the said differential pressure causes actuation of the said valves.

7. A pressure control arrangement for maintaining a fixed differential pressure between a first and second vessel comprising in combination with said vessels, conduit means providing open communication between said vessels, a source of constant pressure, a first means to determine the differential pressure between said source and said first vessel, and a second means to determine the differential pressure between said source and said second vessel, and means associated with said first and second vessels adapted to control pressure within said vessels responsive to the respective pressure differential determinations of said first and second means to determine differential pressure.

8. A pressure control arrangement for maintaining a fixed differential pressure in two vessels each of which vessels is adapted to contain a fluidized bed of solids comprising in combination: conduit means providing open communication between said vessels, a source of constant pressure, a first and second differential pressure metering device adapted to provide a control signal proportional to a differential pressure impressed on each metering device, fluid connections between one of said vessels and the said constant pressure source to the first differential pressure metering device, fluid connections between the other of said vessels and the said constant pressure source to the second differential pressure metering device, a control valve associated with each of said vessels adapted to affect the pressure in the vessels, and means connecting each of said differential pressure metering devices to the respective control valves of each vessel whereby said control signals can operate said valves.

9. A pressure control arrangement for maintaining a fixed differential pressure in two vessels each of which vessels is adapted to contain a fluidized bed of solids comprising in combination: conduit means adapted to transfer solids from one vessel to the other, a source of constant pressure, a first and second differential pressure metering device adapted to provide a control signal proportional to a differential pressure impressed on each metering device, fluid connections between one of said vessels and the said constant pressure source to the first differential pressure metering device, fluid connections between the other of said vessels and the said constant pressure source to the second differential pressure metering device, a control valve associate with each of said vessels adapted to affect the pressure in the vessels, and means connecting each of said differential pressure metering devices to the respective control valves of each vessel whereby said control signals can operate said valves.

References Cited in the file of this patent

UNITED STATES PATENTS

| | | |
|---|---|---|
| 2,345,547 | Roth et al. | Mar. 28, 1944 |
| 2,488,030 | Scheineman | Nov. 15, 1949 |

OTHER REFERENCES

Instruments and Process Control, Delmar Publishers Inc., Albany, N. Y., 1947, pages 25–26.